US007068652B2

(12) United States Patent
Lin et al.

(10) Patent No.: US 7,068,652 B2
(45) Date of Patent: Jun. 27, 2006

(54) POINTER BASED BINARY SEARCH ENGINE AND METHOD FOR USE IN NETWORK DEVICES

(75) Inventors: Jonathan Lin, Fremont, CA (US); Somayajulu Pullela, San Jose, CA (US); David Billings, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 1011 days.

(21) Appl. No.: 10/090,797

(22) Filed: Mar. 6, 2002

(65) Prior Publication Data

US 2002/0133619 A1    Sep. 19, 2002

Related U.S. Application Data

(60) Provisional application No. 60/273,516, filed on Mar. 7, 2001.

(51) Int. Cl.
    *H04J 1/16*    (2006.01)
(52) U.S. Cl. ..................................... 370/389
(58) Field of Classification Search ............... 370/389, 370/351, 352, 252, 254, 401; 709/225, 238; 713/201
    See application file for complete search history.

(56) References Cited

U.S. PATENT DOCUMENTS

6,061,712 A     5/2000  Tzeng
2003/0091042 A1*  5/2003  Lor .......................... 370/389

FOREIGN PATENT DOCUMENTS

WO    WO 00/56024    9/2000

OTHER PUBLICATIONS

Xu, et al.; "A Novel Cache Architecture to Support Layer-Four Packet Classification at Memory Access Speeds", XP-001044239, Proceedings IEEE INFOCOM 2000; Mar. 26-30, 2000, vol. 3 of 3, pp. 1445-1454.

* cited by examiner

*Primary Examiner*—Dang Ton
(74) *Attorney, Agent, or Firm*—Squire, Sanders & Dempsey LLP

(57) ABSTRACT

A network device includes at least one network port, a masks table, a rules table, a pointers table, and a fast filter processor. The masks table contains filter information and a mask key. The rules table contains corresponding rules to the filter information and is related to the mask table by the mask key. The pointers table contains boundary data related to the rules for corresponding filter information. The fast filter processor is coupled to the mask table, the rules table and the pointers table, and configured to perform at least one binary search for at least one rule related to a data packet received by the network device at the at least one network port, the binary search being limited based on the boundary data in the pointers table.

31 Claims, 14 Drawing Sheets

PROTOCOL CHANNEL MESSAGES

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| OP CODE | I P P | RESERVED | NXT CELL | SRC DEST PORT | | | COS | J | S | E | CRC | P | O | LEN | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| RESERVED | | | | | | | BC/MC PORTBITMAP | | | | | | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| U | RES | | | UNTAGGED PORTBITMAP/SRC PORT NUMBER (BIT0..5) | | | | | | | | | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| CPU OPCODES | | | | | | | | | TIME STAMP | | | | | | |

POINTER BASED BINARY SEARCH ENGINE AND METHOD FOR USE IN NETWORK DEVICES

REFERENCE TO RELATED APPLICATIONS

This application claims priority of U.S. Provisional Patent Application Ser. No. 60/273,516 entitled "Pointer based binary table search," filed on Mar. 7, 2001, the contents of which are hereby incorporated by reference.

BACKGROUND OF THE INVENTION

1. Field of the Invention

The invention relates to systems and methods for searching memory in a network device. In particular, the invention relates to pointer based binary table search systems and methods for searching memory within a network device, such as a high performance network switch.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Current basic Ethernet wirespeeds typically range from 10 Megabits per second (Mps) up to 10,000 Mps, or 10 Gigabits per second. As speed has increased, design constraints and design requirements have become more and more complex with respect to following appropriate design and protocol rules and providing a low cost, commercially viable solution.

Competition and other market pressures require the production of more capable network devices that cost less. Increased network and device speed is required by customers.

Network performance, i.e., increased device speed and decreased data packet latency, is directly related to the time that it takes for devices to search memory in conjunction with relaying a packet, e.g. a switch searching memory tables for destination addresses, rules, etc. Thus, in order to support high performance network solutions, new and improved systems and methods are needed for searching memory banks within network devices, such as within a high performance switch.

SUMMARY OF THE INVENTION

According to an embodiment of the present invention, provided is a network device. The network device includes at least one network port, a masks table, a rules table, a pointers table, and a fast filter processor. The masks table contains filter information and a mask key. The rules table contains corresponding rules to the filter information and is related to the mask table by the mask key. The pointers table contains boundary data related to the rules for corresponding filter information. The fast filter processor is coupled to the mask table, the rules table and the pointers table, and configured to perform at least one binary search for at least one rule related to a data packet received by the network device at the at least one network port, the binary search being limited based on the boundary data in the pointers table.

According to an embodiment of the present invention, provided is a fast filter processing circuit. The fast filter processing circuit Includes a rules table, a masks table, a pointers table, a signal generator, a multiplier, a comparator, a multiplexer, and a feedback loop. The rules table has an input and output, and is configured to store rules related to a network function. The masks table has an input and output, and is configured to store masks related to the rules. The pointers table has an input and output. The signal generator is coupled to the masks table and the pointers table, and configured to generate a next mask signal. The multiplier is coupled to the output of the masks table and to a data packet input, and configured to multiply a mask output from the masks table and a data packet input from the data packet input and to output a product of the mask and the data packet. The comparator is coupled to the output of the rules table and the output of the multiplier, and configured to compare the product with a rule output from the rules table and to generate a comparison signal. The multiplexer has a plurality of data inputs and a control input, the control input being coupled to an output of the comparator, and is configured to output an address signal being one of the plurality of data inputs based on the comparison signal input to the control input. The feedback loop is coupled to the output of the multiplexer and the input of the rules table, to a first input of the comparator, to a subtractor and to an adder. Data in the pointers table defines a number of steps for a search and a starting address for the search. The subtractor subtracts a jump value from an input and outputs an address less than a current address by the jump value to a second input of the multiplexer. The adder adds the jump value to an input and outputs an address greater than a current address by the jump value to a third input of the multiplexer. The circuit outputs the output of the rules table, such that a rule matching the data packet based on the mask is output of the circuit.

According to an embodiment of the present invention, provided is a method of filtering a packet in a network device, wherein the network device has a data packet input port and is configured to perform at least one network function. The method includes a steps of providing a masks table, a rules table and a pointers table. The method also includes a step of relating mask data in the masks table to rules data in the rules table with a key, one of the mask data corresponding to one or more of the rules data. The method also includes a step of defining pointer data in the pointers tables defining a maximum and minimum address of corresponding rule data for each of the mask data receiving a data packet at the data packet input port. The method also includes a step of multiplying the data packet with one of the mask data to produce a product. The method also includes a step of searching the rules table based on the product and the maximum and minimum address data for the one of the mask data for a match between the product and rules data corresponding to the one of the mask data. The method also includes a step of outputting the match to a function within the network device in order to perform the at least one network function.

BRIEF DESCRIPTION OF THE DRAWINGS

The objects and features of the invention will be more readily understood with reference to the following description and the attached drawings, wherein:

FIG. 4 illustrates P-channel message types according to an embodiment of the present invention;

DETAILED DESCRIPTION OF THE PREFERRED EMBODIMENTS

Figure 1:
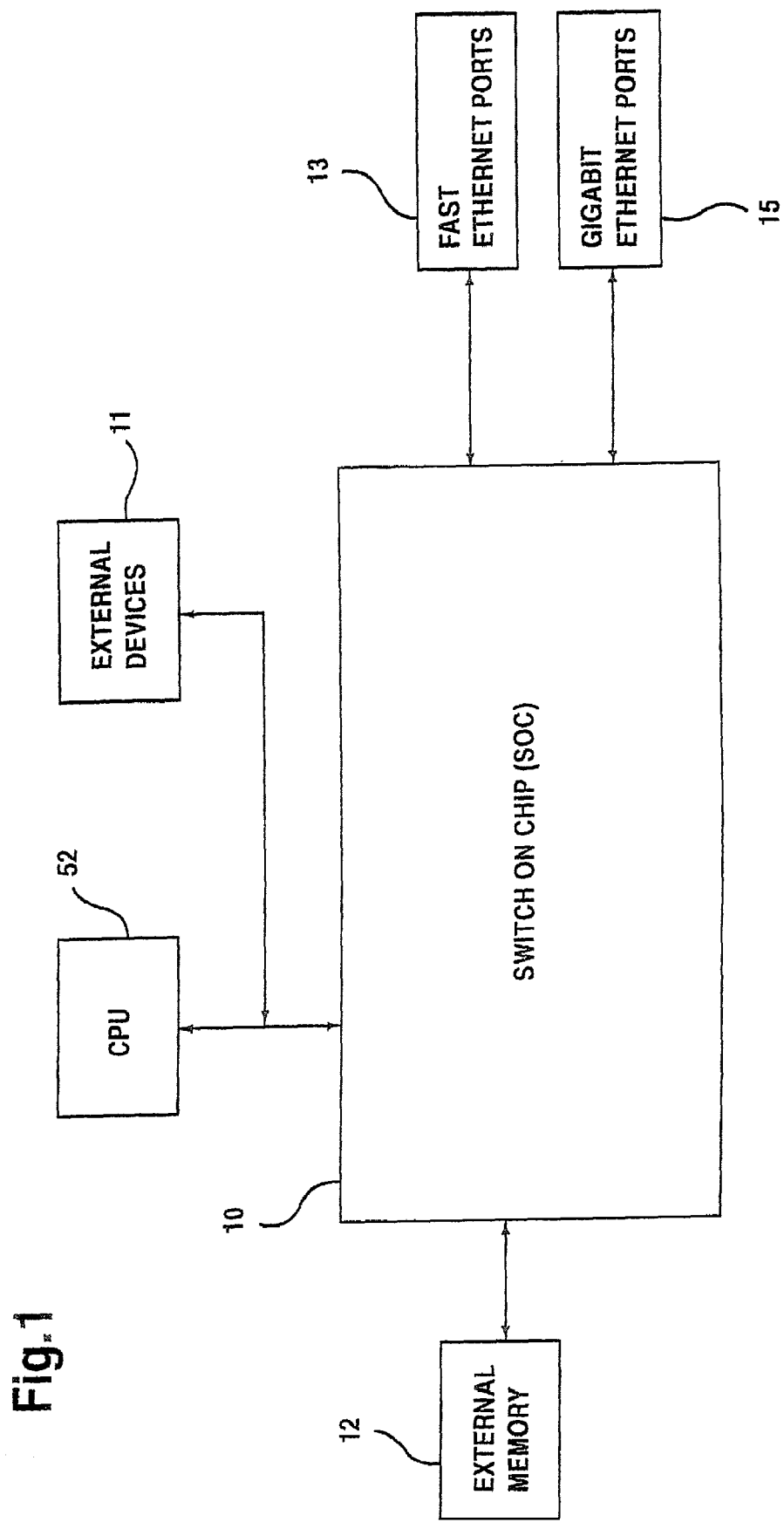
FIG. 1 is a general block diagram of an exemplary network device according to the invention.

FIG. 1 is a basic block diagram of an exemplary high-speed network device to which the present invention is applicable. An exemplary configuration of a network switch is shown. A switch-on-chip (SOC) 10 is functionally connected to external devices 11, external memory 12, fast ethernet ports 13, and gigabit ethernet ports 15. For the purposes of this discussion, fast ethernet ports 13 will be considered low speed ethernet ports, since they may be capable of operating at speeds ranging from 10 Mbps to 100 Mbps in this example, while the gigabit ethernet ports 15, which are high speed ethernet ports, are capable of operating at 1000 Mbps or higher in this example, and preferably 2500 Mbps. External devices 11 could include other switching devices for expanding switching capabilities, or other devices as may be required by a particular application. External memory 12 can be additional off-chip memory, which is in addition to internal memory (on-chip) which is located on SOC 10, which will be discussed below. CPU 52 can be used as desired to program SOC 10 with rules which are appropriate to control packet processing. However, once SOC 10 is appropriately programmed or configured, SOC 10 operates, as much as possible, in a free running manner without communicating with CPU 52. CPU 52 does not control every aspect of the operation of SOC 10, because CPU 52 performance requirements in this example, at least with respect to SOC 10, are fairly low. A less powerful and therefore less expensive CPU 52 can therefore be used when compared to other network switches. As also will be discussed below, SOC 10 utilizes external memory 12 in an efficient manner so that the cost and performance requirements of memory 12 can be reduced. Internal memory on SOC 10, as will be discussed below, could also be configured to maximize switching throughput and minimize costs.

It should be noted that port speeds described are merely exemplary and ports may be configured to handle a variety of speeds faster and slower.

Figure 2:
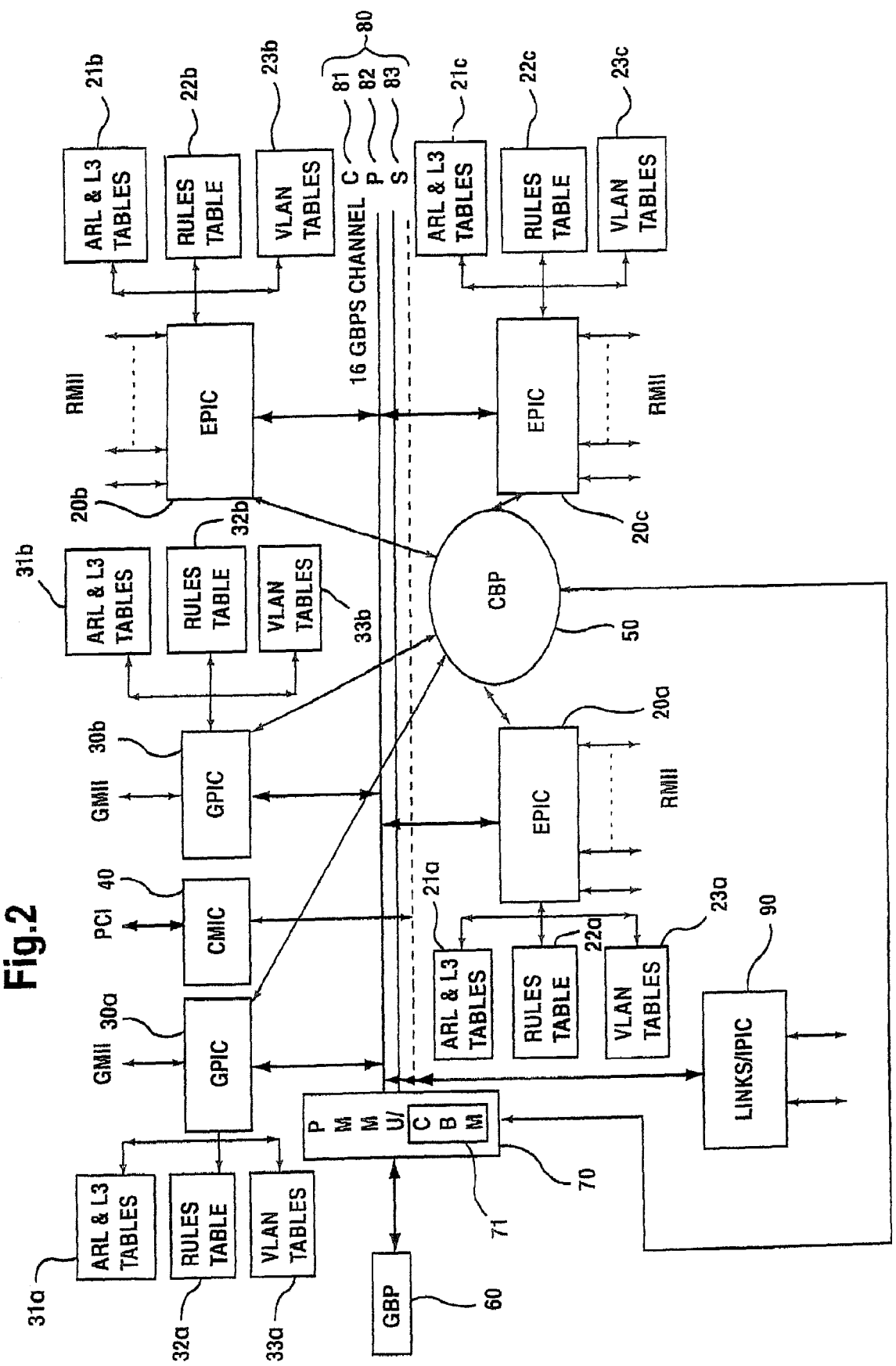
FIG. 2 is a detailed block diagram of a network switch according to the invention.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10. However, other switch configurations or network device configurations may be utilized to produce the present invention.

SOC 10 may include a plurality of Ethernet Port Interface Controllers (EPIC) 20a, 20b, 20c, etc., a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 includes memory management means and communicates with external memory 12, which includes a Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one configuration, this interconnect can be in the form of an interconnect port interface controller (IPIC) 90, which is capable of interfacing CPS channel 80 to external devices 11 through an extendible high speed interconnect link. As will be discussed below, each EPIC 20a, 20b, and 20c, generally referred to as EPIC 20, and GPIC 30a and 30b, generally referred to as GPIC 30, are closely interrelated with appropriate address resolution logic and layer three switching tables 21a, 21b, 21c, 31a, 31b, rules tables 22a, 22b, 22c, 31a, 31b, and VLAN tables 23a, 23b, 23c, 31a, 31b. These tables will be generally referred to as 21, 31, 22, 32, 23, 33, respectively. These tables, like other tables on SOC 10, can be implemented in silicon as two-dimensional arrays.

EPIC 20 may support a number of fast ethernet ports 13 (8 are shown as an example), and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast ethernet, wherein the network is capable of negotiating a highest communication speed between a source and a destination based on the capabilities of the respective devices. The communication speed can vary, as noted previously, for example, between 10 Mbps and 100 Mbps, as an example. Auto-negotiation capability, therefore, is built directly into each EPIC 20 or GPIC 30 module. The address resolution logic (ARL) and layer three tables (ARL/L3) 21*a*, 21*b*, 21*c*, rules table 22*a*, 22*b*, 22*c*, and VLAN tables 23*a*, 23*b*, and 23*c* are configured to be part of, or interface with the associated EPIC in an efficient and expedient manner, in order to support wirespeed packet flow. The on-chip memory which is searched in accordance with the present invention may comprise these tables, as is described below in more detail.

Each EPIC 20 and GPIC 30 has separate ingress and egress functions. On the ingress side, self-initiated and CPU-initiated learning of level 2 address information can occur. Address resolution logic (ARL) is utilized to assist in this task. Address aging is built in as a feature, in order to eliminate the storage of address information which is no longer valid or useful. The EPIC and GPIC can also carry out layer 2 mirroring. A fast filtering processor (FFP) 141 (see FIG. 3) may be incorporated into the EPIC, in order to accelerate packet forwarding and enhance packet flow.

Figure 8:
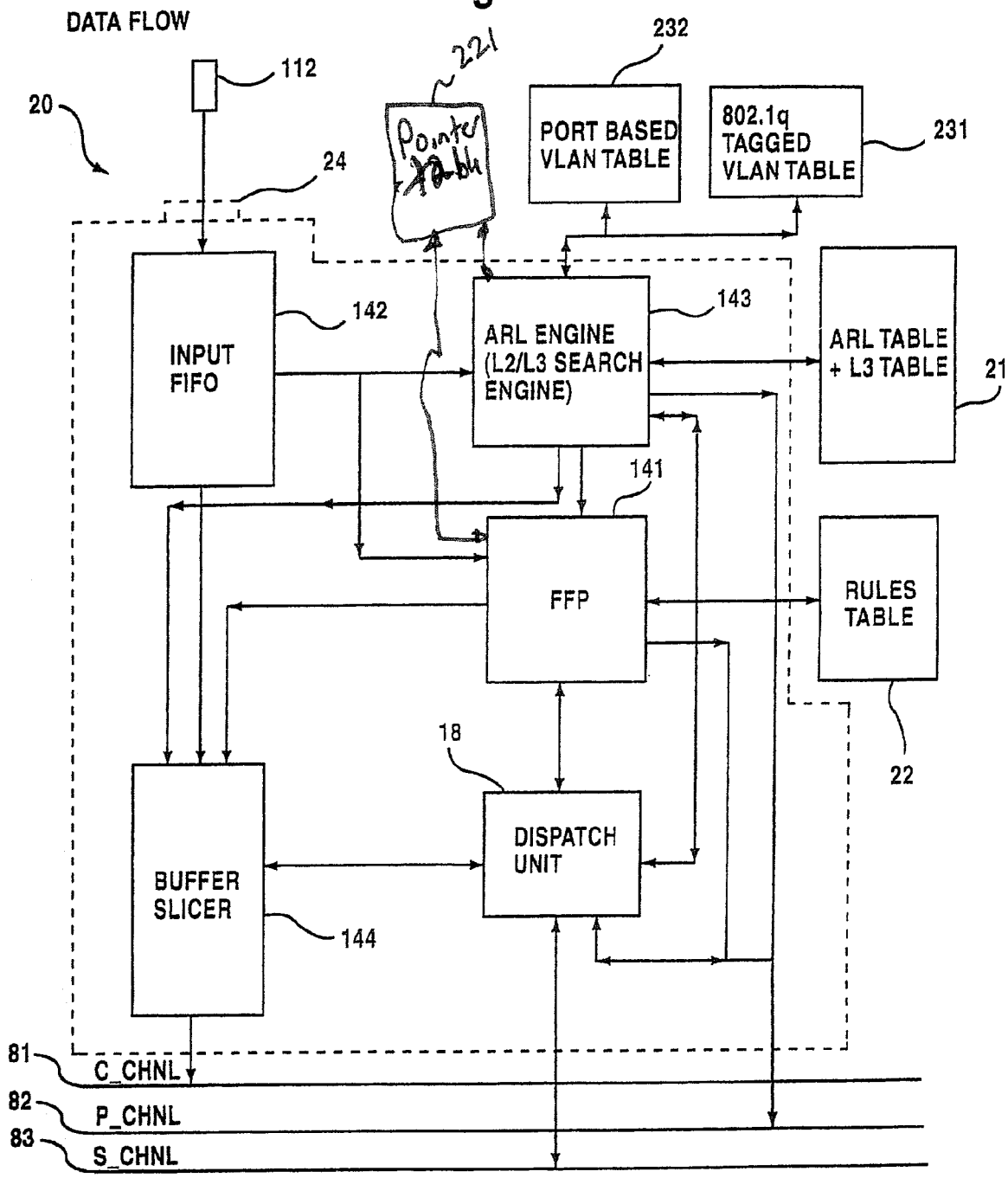
FIG. 8 illustrates an operational diagram of an EPIC module.

The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 can have a separate ingress submodule 14 associated therewith. From an implementation perspective, however, in order to minimize the amount of hardware implemented on the single-chip SOC 10, common hardware elements in the silicon can be used to implement a plurality of ingress submodules on each particular module. The configuration of SOC 10 discussed herein enables concurrent lookups and filtering. Layer two lookups, Layer three lookups and filtering occur simultaneously to achieve a high level of performance, which are described in better detail below. On the egress side, the EPIC and GPIC are capable of supporting packet polling based either as an egress management or class of service (COS) function. Rerouting/scheduling of packets to be transmitted can occur, as well as head-of-line (HOL) blocking notification, packet aging, cell reassembly, and other functions associated with ethernet port interface.

Each GPIC 30 is similar to each EPIC 20, but in this embodiment, supports only one 2.5 gigabit ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

A CMIC 40 can act as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be on-chip data memory. In one configuration, the CBP 50 can be first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 can handle receiving search requests and queue management, and can be responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management. The preceding discussion is an exemplary configuration of an exemplary device, and is not meant to limit the present invention. Accordingly, other functions or facilities may be implemented as memory management units or queue management units in accordance with the present invention.

Global memory buffer pool or GBP 60 can act as a second level memory, and can be located on-chip or off chip. In one configuration, GBP 60 is located off chip with respect to SOC 10. When located off-chip, GBP 60 is considered to be a part of or all of external memory 12. As a second level memory, the GBP can be high speed SRAMs, or can be a slower less expensive memory such as DRAM or any other suitable memory type. The GBP can be tightly coupled to the PMMU 70, and operates like the CBP in that packets are stored as cells. For broadcast and multicast messages, only one copy of the packet is stored in GBP 60.

PMMU 70 can be located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read pre-fetches based upon egress manager/class of service requests, and smart memory control.

As shown in FIG. 2, the CPS channel 80 can be actually three separate channels, referred to as the C-channel, the P-channel, and the S-channel. The C-channel can be 128 bits wide and run at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel can be 32 bits wide and run at 132 MHz.

The S or sideband channel can run, for example, at 132 MHz and be 32 bits wide. Any suitable width and speed is feasible. The S-channel can be used for functions such as for conveying Port Link Status, receive port full, port statistics, ARL table synchronization, memory and register access to CPU and other CPU management functions, relaying rate control messages and global memory full and common memory full notification.

Figure 3:
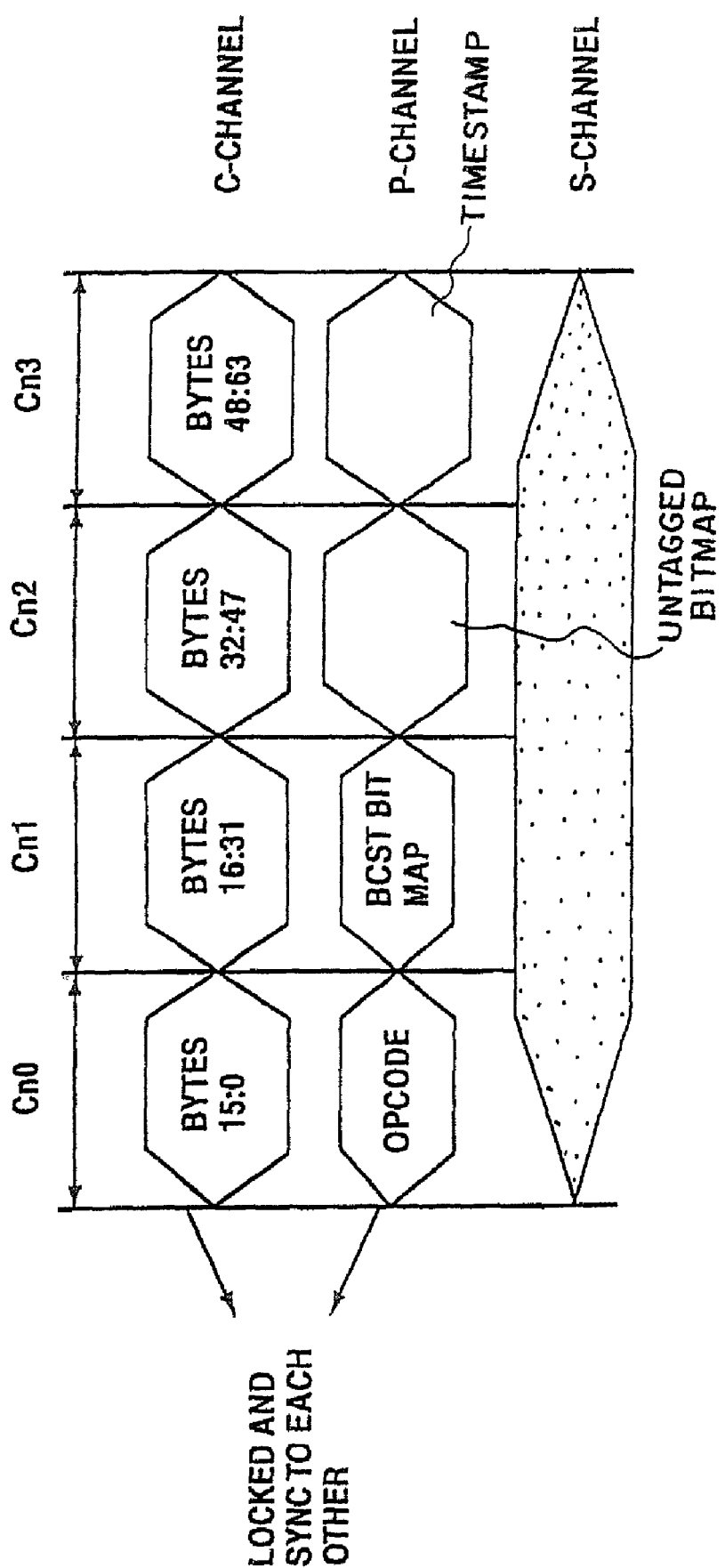
FIG. 3 illustrates the data flow on the CPS channel of a network switch according to an embodiment of the present invention.

A proper understanding of the operation of SOC 10 requires a proper understanding of the operation of CPS channel 80. Referring to FIG. 3, it can be seen that in SOC 10, on the ingress, packets are sliced by an EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In this example of SOC 10, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Arbitration for the CPS channel occurs out of band. Every module (EPIC, GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and EPICs 20 and GPICs 30 share equal access to the C-channel on a round robin basis. FIGS. 4A and 4B illustrate a C-channel arbitration mechanism wherein section A is the PMMU, and section B consists of two GPICs and three EPICs. The sections alternate access, and since the PMMU is the only module in section A, it gains access every other cycle. The modules in section B, as noted previously, obtain access on a round robin basis.

Protocol or P-Channel

Referring once again to the protocol or P-channel, a plurality of messages can be placed on the P-channel in order to properly direct flow of data flowing on the C-channel. Supposing P-channel 82 is 32 bits wide, and a message typically requires 128 bits, four smaller 32 bit messages can be put together in order to form a complete P-channel message. The following list identifies some examples of the fields and function and examples of the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0×01), this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 μsec.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 4.

An early termination message is used to indicate to CBM 71 that the current packet is to be terminated. During operation, as discussed in more detail below, the status bit (S) field in the message is set to indicate the desire to purge the current packet from memory. Also, in response to the status bit, all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid in this example for the last cell of a packet being transmitted as defined by the E bit field of the message.

Last, the time stamp field of the message in this example has a resolution of 1 μs and is valid only for the first cell of the packet defined by the S bit field of the message. A cell is defined as the first cell of a received packet when the S bit field of the message is set to a logical one value.

The C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 can be a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table 22 synchronization, CPU 52 access to GBP 60 and CBP 50 memory buffers and SOC 10 control registers, and memory full notification corresponding to GBP 60 and/or CBP 50.

Figure 5:
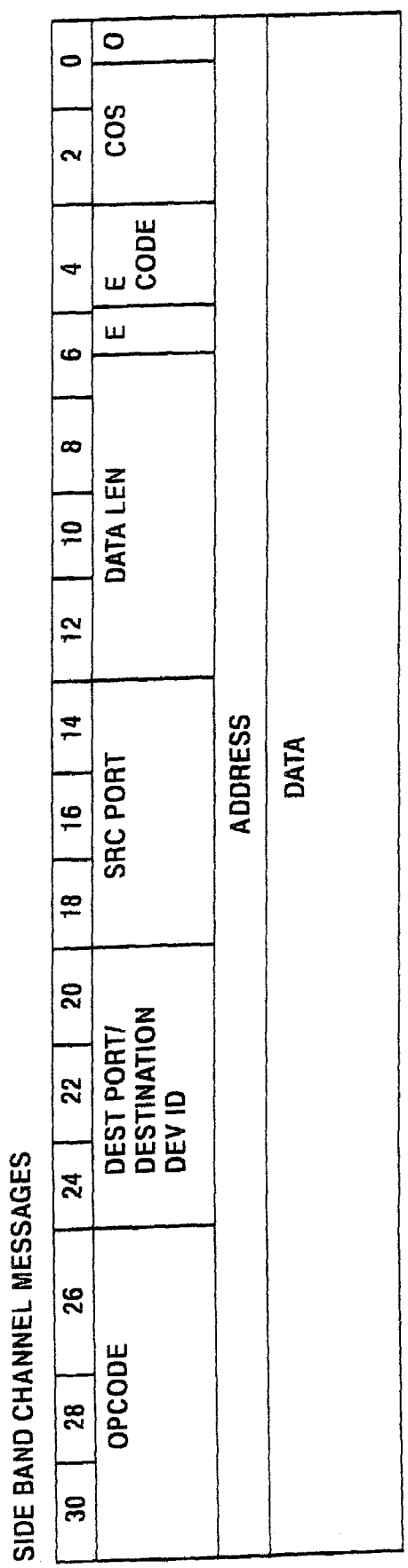
FIG. 5 illustrates a message format for S channel message types according to an embodiment of the present invention.

FIG. 5 illustrates an exemplary message format for an S channel message on S channel 83. The message is formed of four 32-bit words; the bits of the fields of the words are defined as follows:

Opcode—6 bits long—Identifies the type of message present on the S channel;
Dest Port—6 bits long—Defines the port number to which the current S channel message is addressed;
Src Port—6 bits long—Defines the port number of which the current S channel message originated;
COS—3 bits long—Defines the class of service associated with the current S channel message; and
C bit—1 bit long—Logically defines whether the current S channel message is intended for the CPU 52.
Error Code—2 bits long—Defines a valid error when the E bit is set;
DataLen—7 bits long—Defines the total number of data bytes in the Data field;
E bit—1 bit long—Logically indicates whether an error has occurred in the execution of the current command as defined by opcode;
Address—32 bits long—Defines the memory address associated with the current command as defined in opcode;
Data—0–127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the SOC 10 can support fast Ethernet ports, gigabit ports, and extendible interconnect links as discussed above. The SOC configuration can also be "stacked" or "linked", thereby enabling significant port expansion capability. Once data packets have been received by SOC 10, sliced into cells, and placed on CPS channel 80, stacked SOC modules can interface with the CPS channel and monitor the channel, and extract appropriate information as necessary. Of course, slicing is not necessarily critical to the present invention, but is discussed with respect to the present embodiment. As will be discussed below, a significant amount of concurrent lookups and filtering occurs as the packet comes in to ingress submodule 14 of an EPIC 20 or GPIC 30, with respect to layer two and layer three lookups, and fast filtering, according to the present invention.

Table management may also be achieved through the use of the CPU 52. CPU 52, via the CMIC 40, can provide the SOC 10 with software functions which result in the designation of the identification of a user at a given port 24. As discussed above, it is undesirable for the CPU 52 to access the packet information in its entirety since this would lead to performance degradation. Rather, the SOC 10 is programmed by the CPU 52 with identification information concerning the user. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21*a*. If the packet is addressed to one of the layer three (L3) switches of the SOC 10, then the ingress sub-module 14*a* performs the L3 and default table lookup. Once the destination port has been determined, the EPIC 20*a* sets a ready flag in the dispatch unit 18*a* which then arbitrates for C channel 81.

The C channel 81 arbitration scheme, as discussed previously, may be a Demand Priority Round-Robin. Each I/O module, EPIC 20, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If EPIC modules 20*a*, 20*b*, 20*c*, and GPIC modules 30*a* and 30*b*, and CMIC 40 simultaneously request C channel access, then access may be granted in round-robin fashion. For a given arbitration time period each of the I/O modules would be provided access to the C channel 81. For example, each GPIC module 30*a* and 30*b* would be granted access, followed by the EPIC modules, and finally the CMIC 40. After every arbitration time period the next I/O module with a valid request would be given access to the C channel 81.

This pattern would continue as long as each of the I/O modules provide an active C channel 81 access request.

If all the I/O modules, including the PMMU 70, request C channel 81 access, the PMMU 70 is granted access as shown in FIG. 4B since the PMMU provides a critical data path for all modules on the switch. Upon gaining access to the channel 81, the dispatch unit 18a proceeds in passing the received packet 112, one cell at a time, to C channel 81.

Referring again to FIG. 3, the individual C, P, and S channels of the CPS channel 80 are shown. Once the dispatch unit 18a has been given permission to access the CPS channel 80, during the first time period Cn0, the dispatch unit 18a places the first 16 bytes of the first cell 112a of the received packet 112 on the C channel 81. Concurrently, the dispatch unit 18a places the first P channel message corresponding to the currently transmitted cell. As stated above, the first P channel message defines, among other things, the message type. Therefore, this example is such that the first P channel message would define the current cell as being a unicast type message to be directed to the destination egress port 21c.

During the second clock cycle Cn1, the second 16 bytes (16:31) of the currently transmitted data cell 112a are placed on the C channel 81. Likewise, during the second clock cycle Cn1, the Bc/Mc Port Bitmap is placed on the P channel 82.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112a of the incoming packet 112 is placed on the CPS channel 80 the PMMU 70 determines whether the cell is to be transmitted to an egress port 21 local to the SOC 10.

If the PMMU 70 determines that the current cell 112a on the C channel 81 is destined for an egress port of the SOC 10, the PMMU 70 takes control of the cell data flow.

Figure 6:
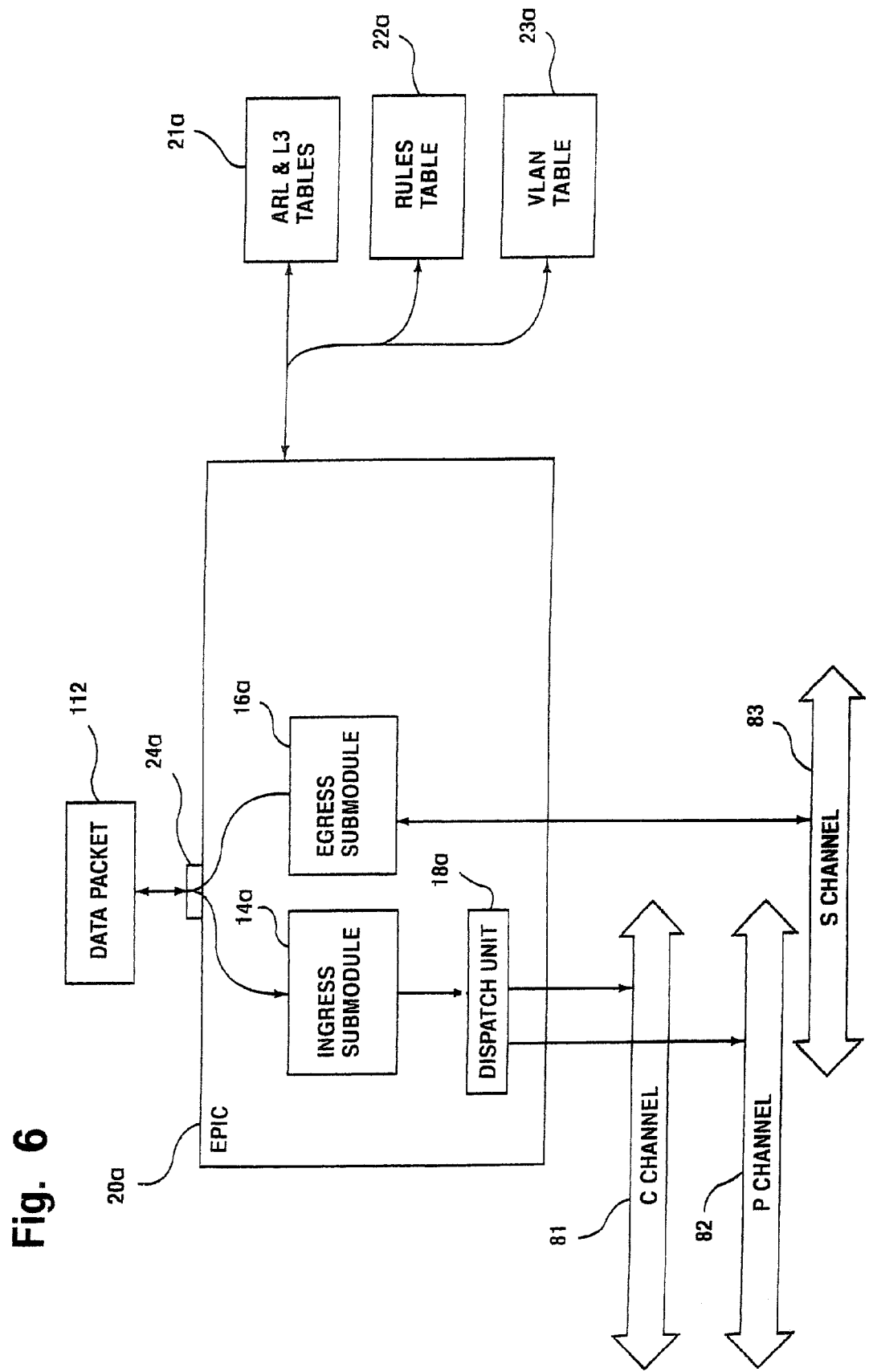
FIG. 6 is a detailed view of elements of the PMMU of a switch according to an embodiment of the present invention.

FIG. 6 illustrates, in more detail, the functional egress aspects of PMMU 70. PMMU 70 includes CBM 71, and interfaces between the GBP, CBP and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112a and 112b.

Figure 7:
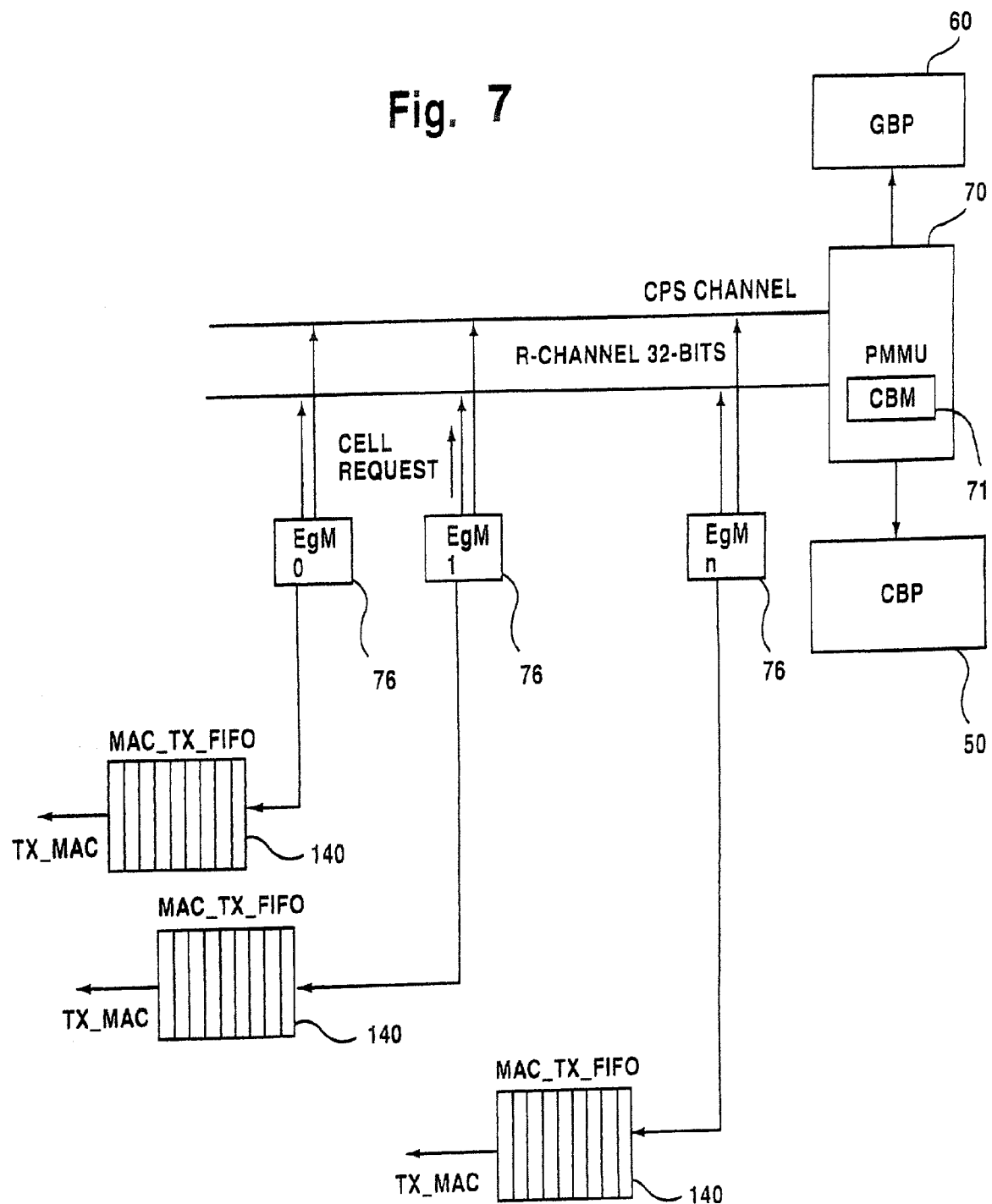
FIG. 7 illustrates the CBM cell format according to an embodiment of the present invention.

CBM 71, in summary, performs the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 7; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within PMMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71 within the PMMU 70.

When PMMU 70 determines, e.g., by a table look-up (i.e., a search described further below), that cell 112a is destined for an appropriate egress port on SOC 10, PMMU 70 controls the cell flow from CPS channel 80 to CBP 50. As the data packet 112 is received at PMMU 70 from CPS 80, CBM 71 determines whether or not sufficient memory is available in CBP 50 for the data packet 112. A free address pool (not shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by PMMU 70, CBM 71 assigns cell pointers. The initial pointer for the first cell 112a points to the egress manager 76 which corresponds to the egress port to which the data packet 112 will be sent after it is placed in memory. In the example of FIG. 6, packets come in to port 24a of EPIC 20a, and are destined for port 24c of EPIC 20c. For each additional cell 112b, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24c. Once the packet is fully written into CBP 50, a corresponding CBP Packet Identifier (CPID) is provided to the appropriate egress manager 76; this CPID points to the memory location of initial cell 112a. The CPID for the data packet is then used when the data packet 112 is sent to the destination egress port 24c. In actuality, the CBM 71 maintains two buffers containing a CBP cell pointer, with admission to the CBP being based upon a number of factors.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112a, 112b of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

Figure 14:
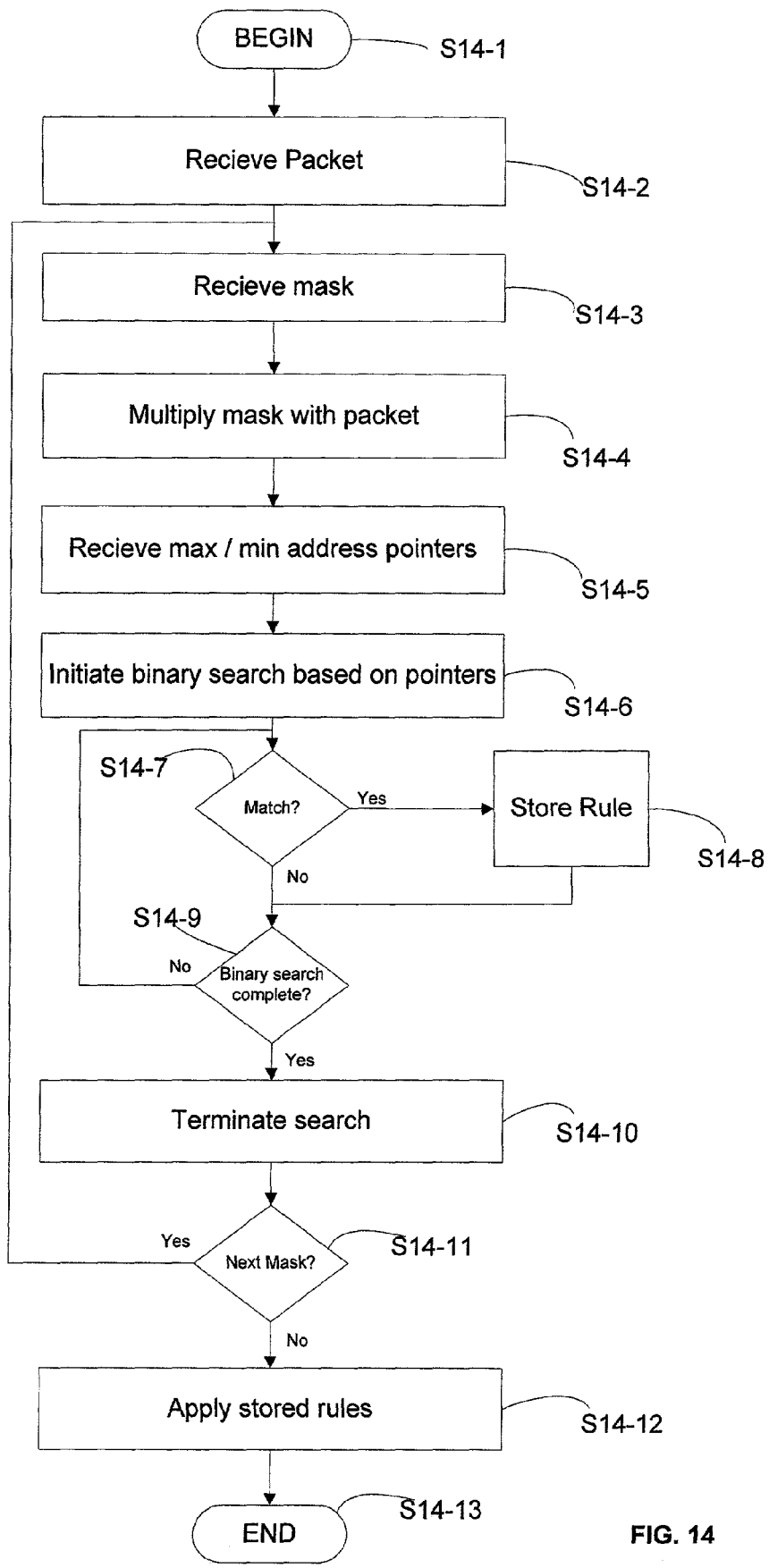
FIG. 14 is a flow chart of a method for performing a pointer based search according to the present invention.

FIG. 8 illustrates some of the concurrent filtering and look-up details of a packet coming into the ingress side of an EPIC 20 according to the present invention. FIG. 14 addresses the application of filtering, address resolution, and rules application segments of SOC 10. These functions are performed simultaneously with respect to the CBP admission. Packet 112 is received at input port 24 of EPIC 20. It is then directed to input FIFO 142. As soon as the first sixteen bytes of the packet arrive in the input FIFO 142, an address resolution request is sent to ARL engine 143; this initiates lookup in ARL/L3 tables 21.

A description of the fields of an ARL table of ARL/L3 tables 21 is as follows:

Mac Address—48 bits long—Mac Address;

VLAN tag—12 bits long—VLAN Tag Identifier as described in IEEE 802.1q standard for tagged packets. For an untagged Packet, this value is picked up from Port Based VLAN Table.

CosDst—3 bits long—Class of Service based on the Destination Address. COS identifies the priority of this packet. 8 levels of priorities as described in IEEE 802.1p standard.

Port Number—6 bits long—Port Number is the port on which this Mac address is learned.

SD_Disc Bits—2 bits long—These bits identifies whether the packet should be discarded based on Source Address or Destination Address. Value 1 mean discard on source. Value 2 means discard on destination.

C bit—1 bit long—C Bit identifies that the packet should be given to CPU Port.

St Bit—1 bit long—St Bit identifies that this is a static entry (it is not learned Dynamically) and that means is should not be aged out. Only CPU 52 can delete this entry.

Ht Bit—1 bit long—Hit Bit—This bit is set if there is match with the Source Address. It is used in the aging Mechanism.

CosSrc—3 bits long—Class of Service based on the Source Address. COS identifies the priority of this packet.

L3 Bit—1 bit long—L3 Bit—identifies that this entry is created as result of L3 Interface Configuration. The Mac address in this entry is L3 interface Mac Address and that any Packet addresses to this Mac Address need to be routed.

T Bit—1 bit long—T Bit identifies that this Mac address is learned from one of the Trunk Ports. If there is a match on Destination address then output port is not decided on the Port Number in this entry, but is decided by the Trunk Identification Process based on the rules identified by the RTAG bits and the Trunk group Identified by the TGID.

TGID—3 bits long—TGID identifies the Trunk Group if the T Bit is set. SOC 10 supports 6 Trunk Groups per switch.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

S C P—1 bit long—Source CoS Priority Bit—If this bit is set (in the matched Source Mac Entry) then Source CoS has priority over Destination Cos.

It should also be noted that VLAN tables 23 include a number of table formats; all of the tables and table formats will not be discussed here. However, as an example, the port based VLAN table fields are described as follows:

Port VLAN Id—12 bits long—Port VLAN Identifier is the VLAN Id used by Port Based VLAN.

Sp State—2 bits long—This field identifies the current Spanning Tree State. Value 0×00—Port is in Disable State. No packets are accepted in this state, not even BPDUs. Value 0×01—Port is in Blocking or Listening State. In this state no packets are accepted by the port, except BPDUs. Value 0×02—Port is in Learning State. In this state the packets are not forwarded to another Port but are accepted for learning. Value 0×03—Port is in Forwarding State. In this state the packets are accepted both for learning and forwarding.

Port Discard Bits—6 bits long—There are 6 bits in this field and each bit identifies the criterion to discard the packets coming in this port. Note: Bits 0 to 3 are not used. Bit 4—If this bit is set then all the frames coming on this port will be discarded. Bit 5—If this bit is set then any 802.1q Priority Tagged (vid=0) and Untagged frame coming on this port will be discarded.

J Bit—1 bit long—J Bit means Jumbo bit. If this bit is set then this port should accept Jumbo Frames.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

T Bit—1 bit long—This bit identifies that the Port is a member of the Trunk Group.

C Learn Bit—1 bit long—Cpu Learn Bit—If this bit is set then the packet is send to the CPU whenever the source Address is learned.

PT—2 bits long—Port Type identifies the port Type. Value 0–10 Mbit Port. Value 1–100 Mbit Port. Value 2-1Gbit Port. Value 3—CPU Port.

VLAN Port Bitmap—28 bits long—VLAN Port Bitmap Identifies all the egress ports on which the packet should go out.

B Bit—1 bit long—B bit is BPDU bit. If this bit is set then the Port rejects BPDUs. This Bit is set for Trunk Ports which are not supposed to accept BPDUs.

TGID—3 bits long—TGID—this field identifies the Trunk Group which this port belongs to.

Untagged Bitmap—28 bits long—This bitmap identifies the Untagged Members of the VLAN. i.e. if the frame destined out of these members ports should be transmitted without Tag Header.

M Bits—1 bit long—M Bit is used for Mirroring Functionality. If this bit is set then mirroring on Ingress is enabled.

The ARL engine 143 reads the packet; if the packet has a VLAN tag according to IEEE Standard 802.1q, then ARL engine 143 performs a look-up based upon tagged VLAN table 231, which is part of VLAN table 23. If the packet does not contain this tag, then the ARL engine performs VLAN lookup based upon the port based VLAN table 232. Once the VLAN is identified for the incoming packet, ARL engine 143 performs an ARL table search based upon the source MAC address and the destination MAC address. If the results of the destination search is an L3 interface MAC address, then an L3 search is performed of an L3 table within ARL/L3 table 21. If the L3 search is successful, then the packet is modified according to packet routing rules.

To better understand lookups, learning, and switching, it may be advisable to once again discuss the handling of packet 112 with respect to FIG. 6. If data packet 112 is sent from a source station A into port 24a of EPIC 20a, and destined for a destination station B on port 24c of EPIC 20c, ingress submodule 14a slices data packet 112 into cells 112a and 112b. The ingress submodule then reads the packet to determine the source MAC address and the destination MAC address. As discussed previously, ingress submodule 14a, in particular ARL engine 143, performs the lookup of appropriate tables within ARL/L3 tables 21a, and VLAN table 23a, to see if the destination MAC address exists in ARL/L3 tables 21a; if the address is not found, but if the VLAN IDs are the same for the source and destination, then ingress submodule 14a will set the packet to be sent to all ports. The packet will then propagate to the appropriate destination address. A "source search" and a "destination search" may occur in parallel. Concurrently, the source MAC address of the incoming packet can be "learned", and therefore added to an ARL table within ARL/L3 table 21a. After the packet is received by the destination, an acknowledgement is sent by destination station B to source station A. Since the source MAC address of the incoming packet is learned by the appropriate table of B, the acknowledgement is appropriately sent to the port on which A is located. When the acknowledgement is received at port 24a, therefore, the ARL table learns the source MAC address of B from the acknowledgement packet. It should be noted that as long as the VLAN IDs (for tagged packets) of source MAC addresses and destination MAC addresses are the same, layer two switching as discussed above is performed. L2 switching and lookup is therefore based on the first 16 bytes of an incoming packet. For untagged packets, the port number field in the packet is indexed to the port-based VLAN table within VLAN table 23a, and the VLAN ID can then be determined. If the VLAN IDs are different, however, L3 switching is necessary wherein the packets are sent to a different VLAN. L3 switching, however, is based on the IP header field of the packet. The IP header includes source IP address, destination IP address, and TTL (time-to-live).

In order to more clearly understand layer three switching, data packet 112 is sent from source station A onto port 24a of EPIC 20a, and is directed to destination station B; assume, however, that station B is disposed on a different VLAN, as evidenced by the source MAC address and the destination MAC address having differing VLAN IDs. The lookup for B would be unsuccessful since B is located on a different VLAN, and merely sending the packet to all ports on the VLAN would result in B never receiving the packet. Layer three switching, therefore, enables the bridging of VLAN boundaries, but requires reading of more packet information than just the MAC addresses of L2 switching. In addition to reading the source and destination MAC addresses, therefore, ingress 14a also reads the IP address of the source and destination. As noted previously, packet types are defined by IEEE and other standards, and are known in the art. By reading the IP address of the destination, SOC 10 is able to target the packet to an appropriate router interface which is consistent with the destination IP address. Packet 112 is therefore sent on to CPS channel 80 through dispatch unit 18a, destined for an appropriate router interface (not shown, and not part of SOC 10), upon which destination B is located. Control frames, identified as such by their destination address, are sent to CPU 52 via CMIC 40. The destination MAC address, therefore, is the router MAC address for B. The router MAC address is learned through the assistance of CPU 52, which uses an ARP (address resolution protocol) request to request the destination MAC address for the router for B, based upon the IP address of B. Through the use of the IP address, therefore, SOC 10 can learn the MAC address. Through the acknowledgement and learning process, however, it is only the first packet that is subject to this "slow" handling because of the involvement of CPU 52. After the appropriate MAC addresses are learned, linespeed switching can occur through the use of concurrent table lookups since the necessary information will be learned by the tables. Implementing the tables in silicon as two-dimensional arrays enables such rapid concurrent lookups. Once the MAC address for B has been learned, therefore, when packets come in with the IP address for B, ingress 14a changes the IP address to the destination MAC address, in order to enable linespeed switching. Also, the source address of the incoming packet is changed to the router MAC address for A rather than the IP address for A, so that the acknowledgement from B to A can be handled in a fast manner without needing to utilize a CPU on the destination end in order to identify the source MAC address to be the destination for the acknowledgement. Additionally, a TTL (time-to-live) field in the packet is appropriately manipulated in accordance with the IETF (Internet Engineering Task Force) standard. A unique aspect of SOC 10 is that all of the switching, packet processing, and table lookups are performed in hardware, rather than requiring CPU 52 or another CPU to spend time processing instructions. It should be noted that the layer three tables for EPIC 20 can have varying sizes.

Referring again to the discussion of FIG. 8, as soon as the first 64 (sixty four) bytes of the packet arrive in input FIFO 142, a filtering request is sent to FFP 141. FFP 141 is an extensive filtering mechanism which enables SOC 10 to set inclusive and exclusive filters on any field of a packet from layer 2 to layer 7 of the OSI seven layer model. Filters are used for packet classification based upon a protocol fields in the packets. Various actions may be performed based upon the packet classification, including packet discard, sending of the packet to the CPU, sending of the packet to other ports, sending the packet on certain COS priority queues, changing the type of service (TOS) precedence.

An exclusive filter is primarily used for implementing security features, and allows a packet to proceed only if there is a filter match. If there is no match, the packet is discarded.

It should be noted that SOC 10 has a unique capability to handle both tagged and untagged packets coming in. Tagged packets are tagged in accordance with IEEE standards, and include a specific IEEE 802.1p priority field for the packet. Untagged packets, however, do not include an 802.1p priority field therein. SOC 10 can assign an appropriate COS value for the packet, which can be considered to be equivalent to a weighted priority, based either upon the destination address or the source address of the packet, as matched in one of the table lookups. As noted in the ARL table format discussed herein, an SCP (Source COS Priority) bit is contained as one of the fields of the table. When this SCP bit is set, then SOC 10 can assign weighted priority based upon a source COS value in the ARL table. If the SCP is not set, then SOC 10 will assign a COS for the packet based upon the destination COS field in the ARL table. These COS of values are three bit fields in the ARL table, as noted previously in the ARL table field descriptions.

FFP 141 is essentially a state machine driven programmable rules engine. The filters used by the FFP may be, for example, sixty-four bytes wide, and are applied on an incoming packet; any offset can be used, however, a preferred, embodiment uses an offset of zero, and therefore operates on the first 64 bytes, or 512 bits, of a packet. The actions taken by the filter may include tag insertion, priority mapping, TOS tag insertion, sending of the packet to the CPU, dropping of the packet, forwarding of the packet to an egress port, and sending the packet to a mirrored port. The filters utilized by FFP 141 are defined by rules table 22. Rules table 22 is completely programmable by CPU 52, through CMIC 40. The rules table can be, for example, 256 entries deep, and may be partitioned for inclusive and exclusive filters, with, again as an example, 128 entries for inclusive filters and 128 entries for exclusive filters.

A filter database, within FFP 141, includes a number of inclusive mask registers and exclusive mask registers, such that the filters are formed based upon the rules in rules table 22, and the filters therefore essentially form a 64 byte wide mask or bit map which is applied on the incoming packet. Masks and rules are related to one another such that every mask may have zero, one or more rules. A rule may be related to one or more masks. The masks and the rueles may be related by a key, e.g., the first four bits of the mask may be included in the first four bits of corresponding rules. Hereinafter, this key may be referred to as the mask key.

If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, therefore, action is taken as specified in the action field; the actions which may be taken, are discussed above. If there is no full match or exact of all of the filter fields, but there is a partial match, then the packet is dropped. A partial match is defined as either a match on the ingress field, egress field, or filter select fields. If there is neither a full match nor a partial match with the packet and the exclusive filter, then no action is taken and the packet proceeds through the forwarding process. The FFP configuration, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with sets of inclusive filters and of exclusive filters, as separate filter masks. As a packet comes into the FFP, the filter masks are applied to the packet; in other words, a logical AND operation is performed with the mask and the packet. If the resultant product matches a rule, the matching entries are applied to rules tables 22, in order to determine which specific actions will be taken. As mentioned previously, the actions include 802.1p tag insertion, 802.1p priority mapping, IP TOS (type-of-service) tag insertion, sending of the packet to the CPU, discarding or dropping of the packet, forwarding the packet to an egress port, and sending the packet to the mirrored port. Since there are a limited number of fields in the rules table, and since particular rules must be applied for various types of packets, the rules table requirements can be minimized in the present invention by the present invention setting all incoming packets to be "tagged" packets; all untagged packets, therefore, are subject to 802.1p tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 9:
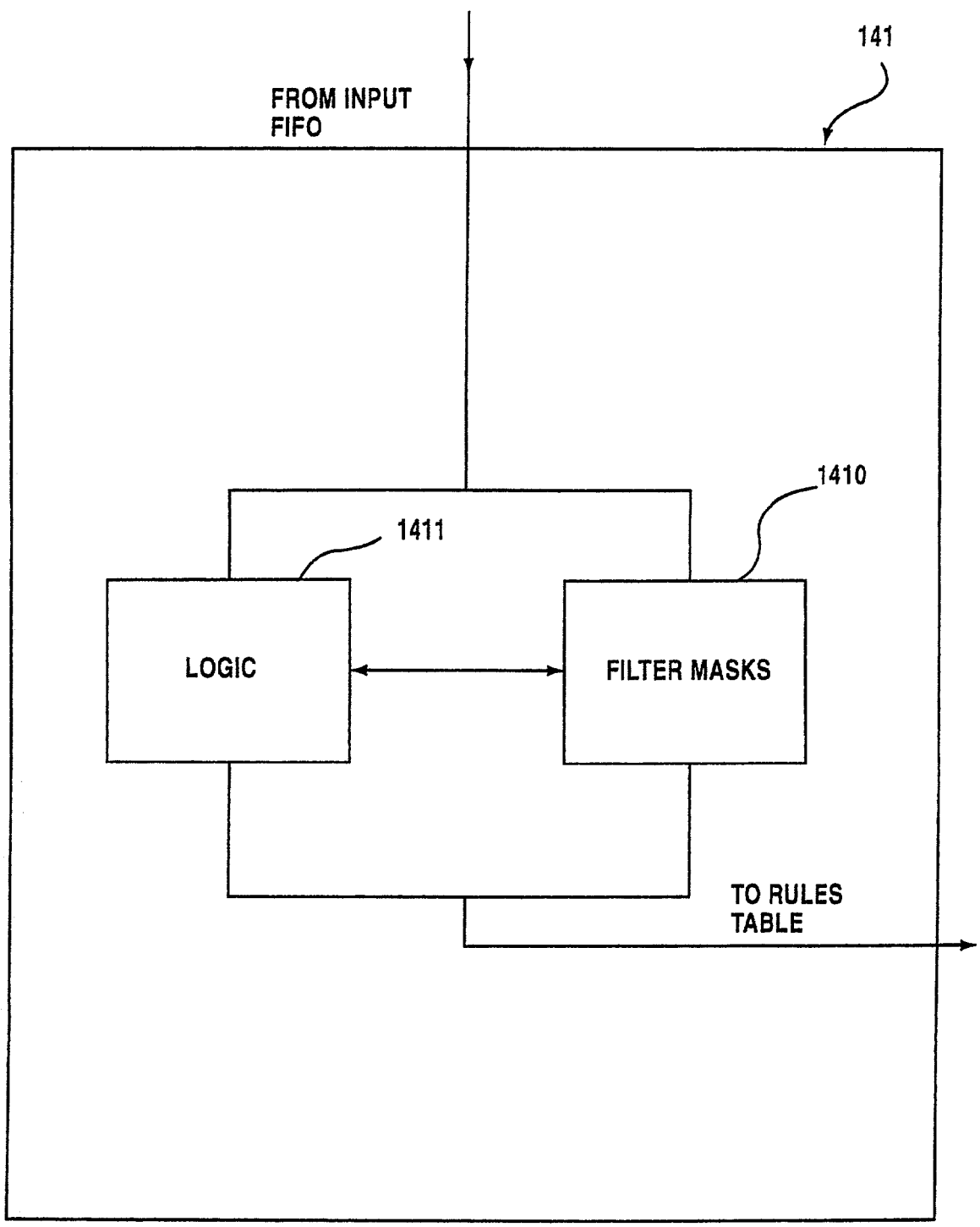
FIG. 9 is a block diagram of a Fast Filter Processor according to an embodiment of the present invention.

Referring to FIG. 9, FFP 141 is shown to include filter database 1410 containing filter masks therein, communicating with logic circuitry 1411 for determining packet types and applying appropriate filter masks. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring back to FIG. 8, after FFP 141 applies appropriate configured filters and results are obtained from the appropriate rules table 22, logic 1411 in FFP 141 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 144, and the packet is placed on C channel 81. The control message and message header information is applied by the FFP 141 and ARL engine 143, and the message header is placed on P channel 82. Dispatch unit 18, also generally discussed with respect to FIG. 8, coordinates all dispatches to C channel, P channel and S channel. As noted previously, each EPIC module 20, GPIC module 30, PMMU 70, etc. are individually configured to communicate via the CPS channel. Each module can be independently modified, and as long as the CPS channel interfaces are maintained, internal modifications to any modules such as EPIC 20a should not affect any other modules such as EPIC 20b, or any GPICs 30.

Figure 10:
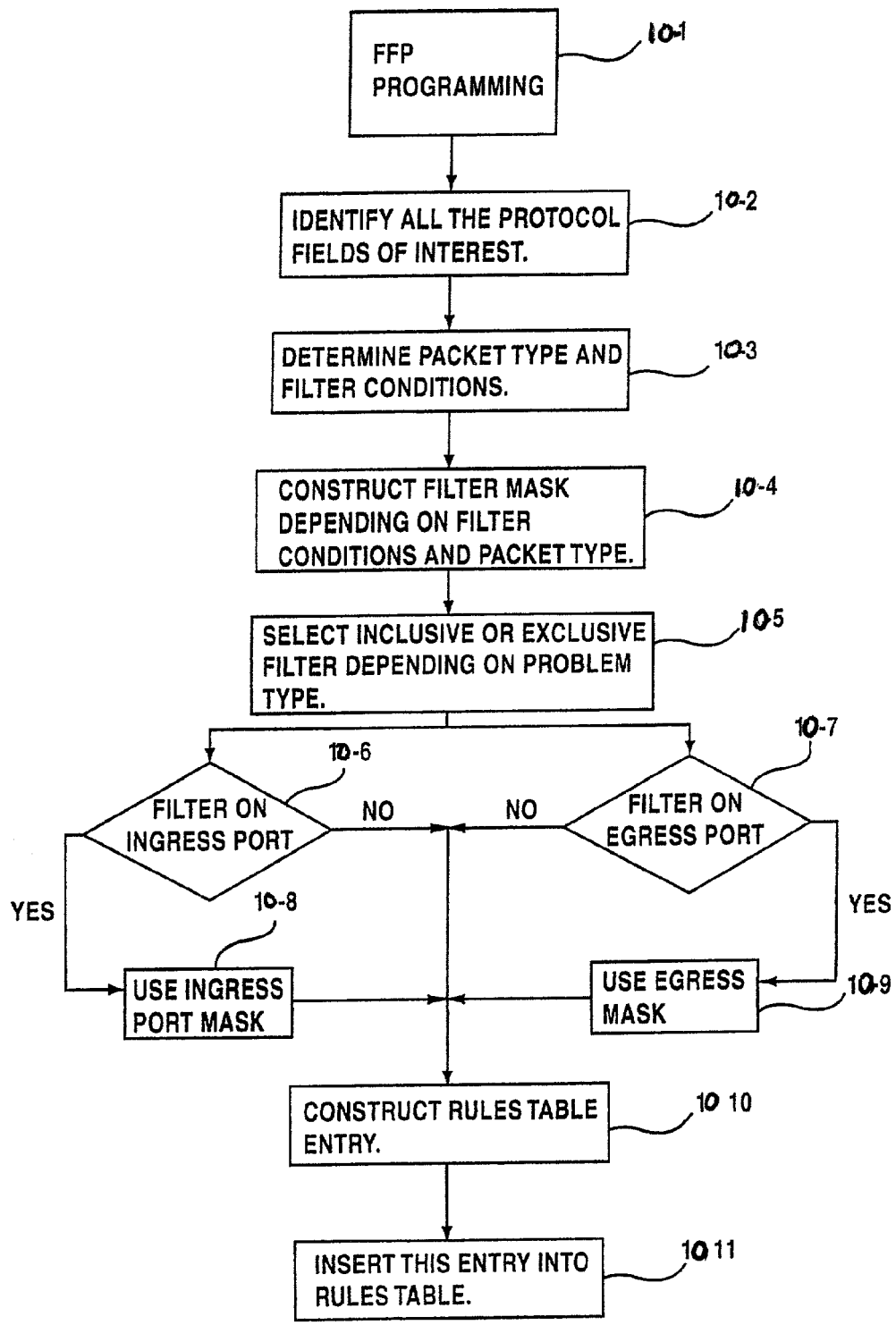
FIG. 10 is a Fast Filter Processor programming flowchart according to the present invention.

As mentioned previously, FFP 141 may be programmed by the user, through CPU 52, based upon the specific functions which are sought to be handled by each FFP 141. Referring to FIG. 10, it can be seen that in step 10-1, an FFP programming step is initiated by the user. Once programming has been initiated, the user identifies the protocol fields of the packet which are to be of interest for the filter, in step 10-2. In step 10-3, the packet type and filter conditions are determined, and in step 10-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 10-6, it is determined whether or not the filter is on the ingress port, and in step 10-7, it is determined whether or not the filter is on the egress port. If the filter is on the ingress port, an ingress port mask is used in step 10-8. If it is determined that the filter will be on the egress port, then an egress mask is used in step 10-9. Based upon these steps, a rules table entry for rules tables 22 is then constructed, and the entry or entries are placed into the appropriate rules table (steps 10-10 and 10-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

It should also be noted that the block diagram of SOC 10 in FIG. 2 illustrates each GPIC 30 having its own ARL/L3 tables 31, rules table 32, and VLAN tables 33, and also each EPIC 20 also having its own ARL/L3 tables 21, rules table 22, and VLAN tables 23. In a preferred embodiment of the invention, however, two separate modules can share a common ARL/L3 table and a common VLAN table. Each module, however, has its own rules table 22. For example, therefore, GPIC 30a may share ARL/L3 table 21a and VLAN table 23a with EPIC 20a. Similarly, GPIC 30b may share ARL table 21b and VLAN table 23b with EPIC 20b. This sharing of tables reduces the number of gates which are required to implement the invention, and makes for simplified lookup and synchronization as will be discussed below.

In support of high-speed switching, the present invention includes improved systems and methods for performing the fast filter processing described above. In particular, FFP 141 is configured to search ARL tables 21, rules table 22 and VLAN table 23 using a pointer based binary search. Binary searches are an efficient and quick method of searching within a high performance switch. A brief discussion of binary searching according to the present invention is provide in order to better understand parallel searching, which is discussed in detail below.

Figure 11:
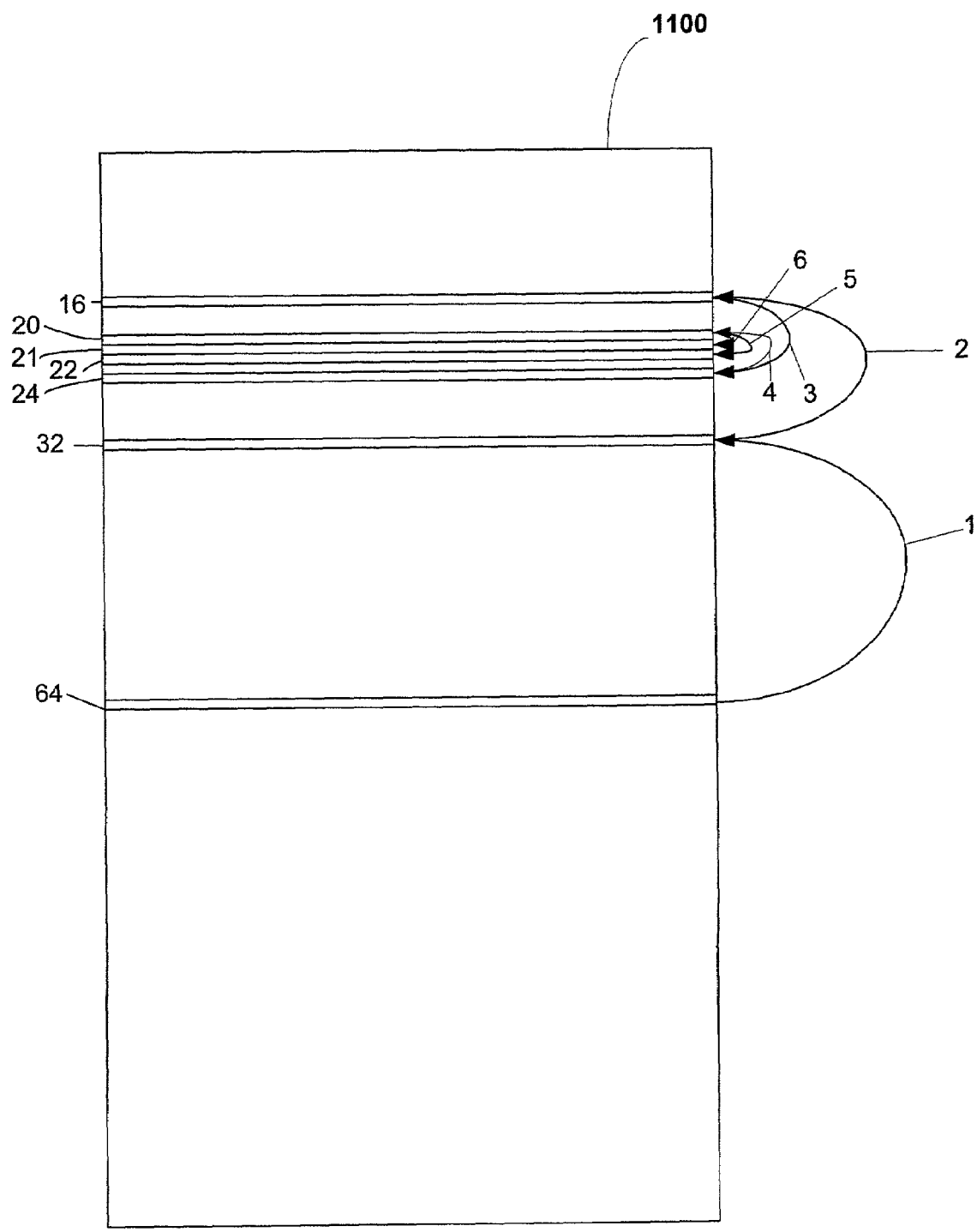
FIG. 11 is an exemplary table to be searched, which could be any of the on-chip tables, accordingly to the present invention.

Referring to FIG. 11, shown is an exemplary table 1100 to be searched, which could be any of the on-chip tables already described above. Assuming that table 1100 is sorted in an order, a binary search is extremely efficient. Binary search steps are illustrated by curved arrows. First, a search begins in the center of a memory bank (unless it's indexed). As an example, the table has 128 rows or memory units (word lines, etc.). Therefore, the search begins at row 64. The search engine or facility controlling the search, such as the FFP 141, PMMU 70 or CBM 71, compares the value stored in row 64 against the search criteria. If the value is greater than or less than the search criteria, then the search jumps up or down, respectively, a number of rows equal to $2^{(m-n)}$, where m is logarithm of the number of rows in the table, and n is the number of the current search step. For example, in a 128 row table, step 1 begins at row $64=2^{(m-n)}=2^{7-1}=2^6$. At step 2, the next jump is plus or minus $2^5=32$, therefore, the search jumps down to 32 or up to 96 depending on the result of the comparison. As a result, the distance jumped is cut in half each step.

The search continues jumping until a match is found, that is, until the value is not higher or low than the search criteria. As an example, if the match is in a row 21, the process steps from 64 to 32 at step 1, because 21 is less than 64. Next, at step 2, the search jumps from 32 to 16. Since 21 is greater than 16, the search then jumps from 16 to 20, then from 20 to 22, and finally from 22 to back to 21, at step 6. Note the search takes a total of six steps. Considering that the memory bank contains 128 rows, which could require a full scan of 128 steps to find a match, a binary search is much more efficient.

Referring back to FIG. 8, EPIC may also include a pointers table 221 for maintaining the maximum (MAX) and minimum (MIN) addresses of rules for corresponding masks. As described above, masks (filters) may be related to rules by a key. Accordingly, as an example, pointers table 221 may be created to maintain the rules MAX and MIN addresses (boundary) for each mask. Pointers table 221 may contain additional useful data, such as the number of steps, initial address, size of increment, etc. Then, to improve switch performance, the FFP 141 may be configured to search the rules table within the boundary defined by the pointers table 221 for each mask. Accordingly, a binary search would be initiated only in the area of the table corresponding to the specified mask, and would take fewer steps. The number of steps, starting point, and delta for each "jump" may be calculated using the same formulas as described with reference to FIG. 11 by using the MAX and MIN pointers. For example, the number of steps is equal to $\log_2(\text{MAX}-\text{MIN})+1$, and the amount to jump=$2^{(5-current\ step)}$. The rules and pointers tables can be set-up during programming or initiation as described above. A method for creating and maintaining pointers table 221 is described below with reference to FIG. 13.

Figure 12:
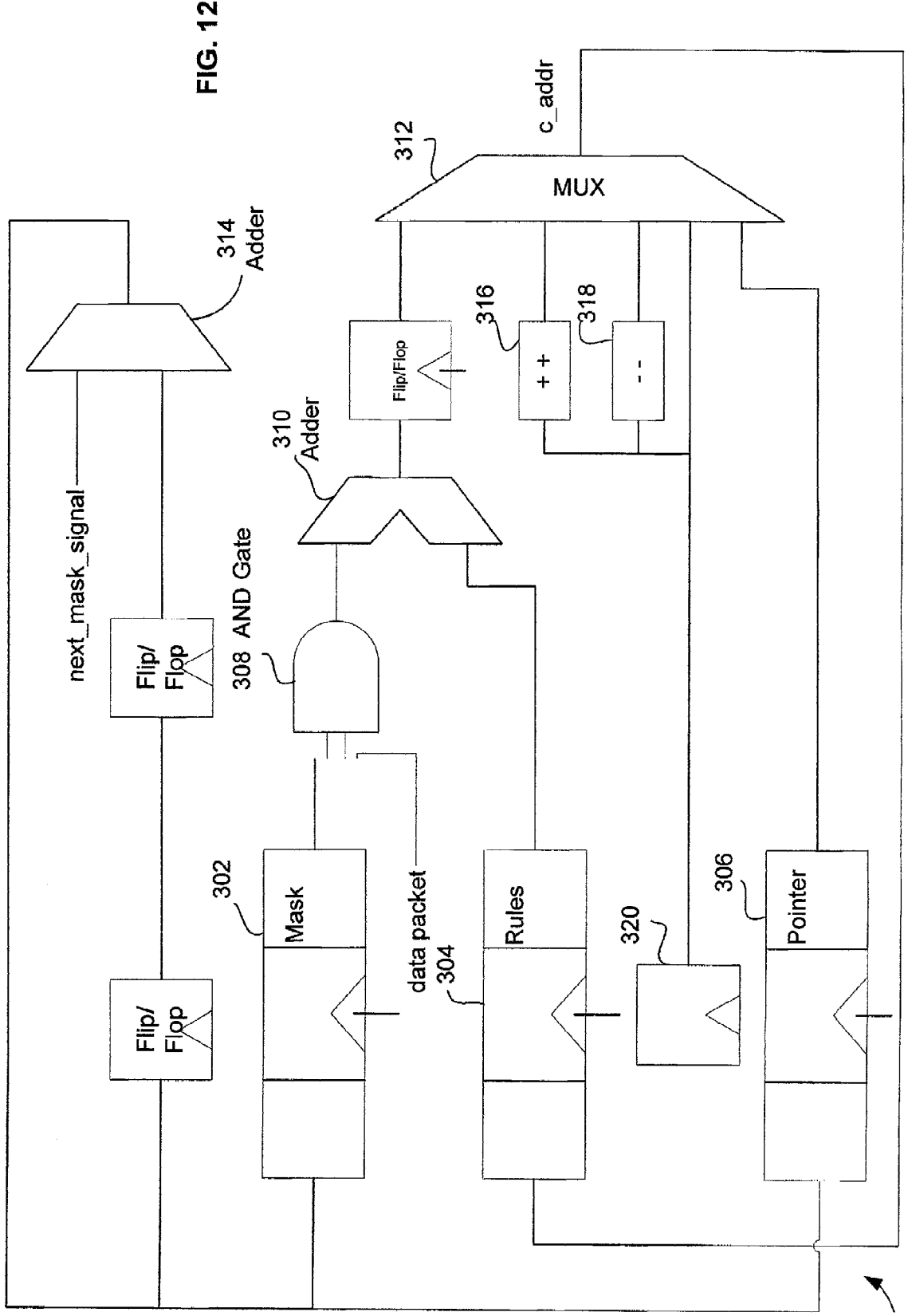
FIG. 12 is a block diagram of on-chip logic for performing searches in accordance with the present invention.

FIG. 12 is a block diagram of on-chip logic (i.e., silicon components or circuits) which may be comprised in FFP 141, for performing searches in accordance with the present invention. In particular, to begin a search in a circuit 300, a new_mask signal or next_signal is ANDed with a timing signal in ADDR 314. The new_mask or next-mask signal is input into the mask table 302 and the pointer table 306. In response to the signal, the mask table 302 outputs the first mask into AND gate 308 where a data packet and the mask are ANDed together, then the product is compared in comparator 310 with rules for a match. The output of the pointer table 306 is input into MUX 312 which receives a control signal output from comparator 310 through a flip-flop 320. MUX 312 also receives as inputs a feedback loop through a flip-flop 322 providing the previous address, and the next binary search addresses for a ">" or "<" than comparison through adder 316 or subtractor 318 which add or subtract the next increment for the step of the binary search, respectively. On initiation, such as when the FFP 141 receives a data packet to filter, the output of MUX 312 is the median address of the boundary created by the pointer as described above. This address is input into rules table 304, and the rule with that address is output into comparator 310 and compared with the product of the mask and the data packet from AND gate 308. The output of the comparator 310 is a signal representing either ">", "<", or "=" result of the comparison. MUX 312 is configured to receive the control signal of ">", "<", or "=", and to output the appropriate next address based on the comparison and the inputs from adder 316, subtractor 318 and flip-flip 322. For example, as described above, a binary search will make a series of jumps up and down a table based on whether the record is greater than or less than each row read. The circuit 300 is configured to cycle through the number of steps for a particular search based on the pointer, and then generate a next mask signal to initiate the next mask. If a match in comparator 310 is made before all the steps of a particular search have cycled through, then comparator 310 will output an "=" signal to MUX 312. MUX 312 is configured to output the previous address input from flip-flip 322, such that the output to other FFP logic will be the rule address of the match. This output will remain constant until all steps for a particular search are complete, since a match at comparator 310 will occur on every cycle after that until a new mask is input to circuit 300. Accordingly, the circuit is able to cycle through each mask from mask table 302 and perform a binary search within the rules table 304 defined by the boundary data stored in the pointers table 306, and output to other switch logic the addresses of all the matches. As described above, SOC 10 is configured to perform switching functions based on the rules which are matched, and apply the rules to the data packet.

Figure 13:
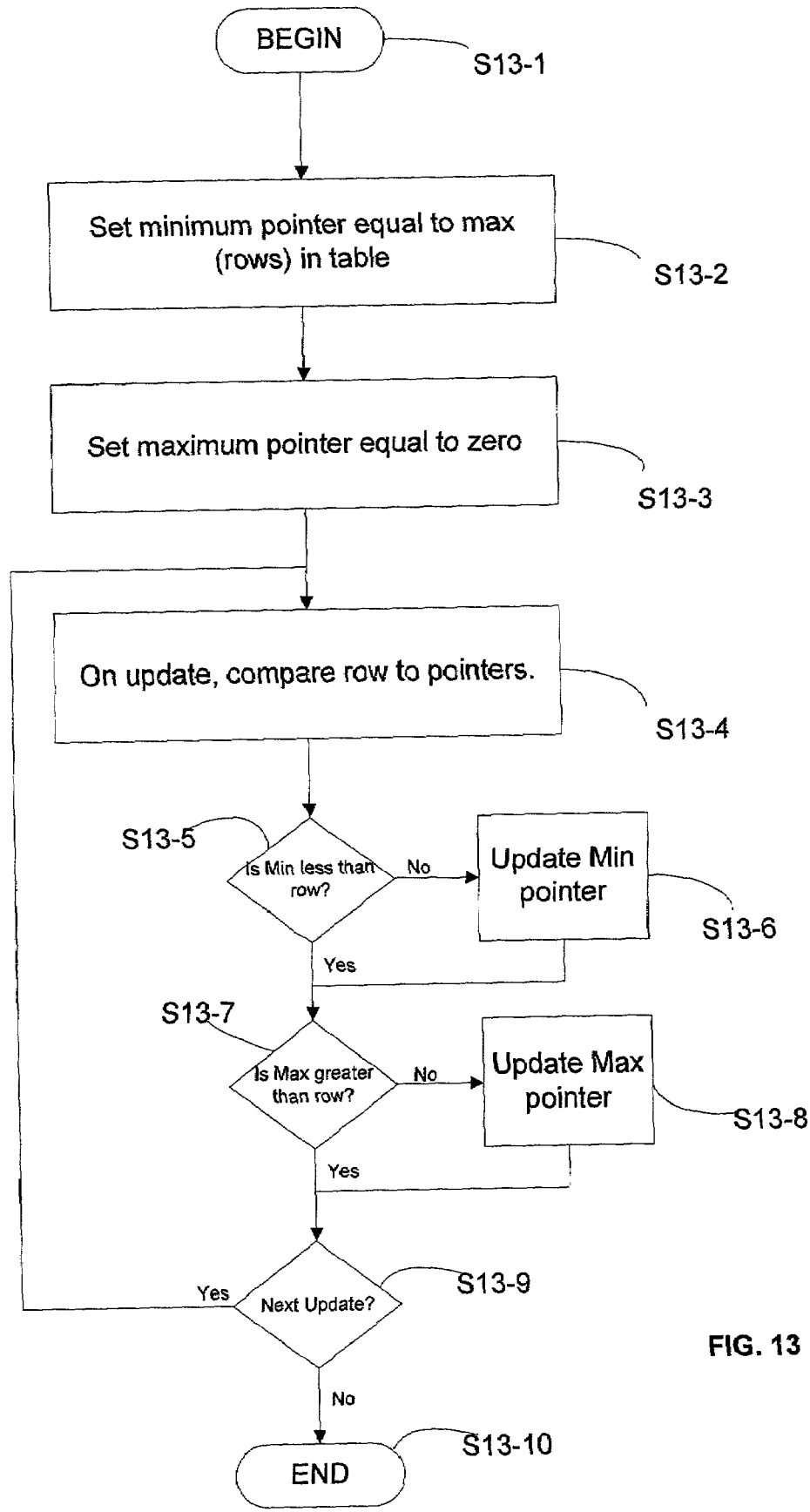
FIG. 13 is a flow chart of a method initiation pointers for a search according to the present invention.

FIG. 13 is a flowchart of a method for updating a pointers table in accordance with the present invention. Process begins at step S13-1 and proceeds to immediately to step S13-2. At step S13-2, the minimum (MIN) pointer for each mask (or for a new mask) is set to the number of rows in the table. For example, as already described above, if the table has 256 rows, then the MIN is set to 255.

Next, at step S13-3, the maximum (MAX) pointer is set to zero for all masks. At step S13-4, on insert or update to the table, the row being updated or inserted is compared against the pointers in order to update the pointers table. For example, as described above, the CPU 52 is configured to perform table management and to perform inserts into the masks and rules table. When an insert or update is done to the rules table, the row number is compared to the min pointer at step S13-5, and if the MIN is greater than the row being inserted, then at step S13-6 the pointers table is updated with a new MIN pointer for the mask or rule. Similarly at step S13-7, the MAX is compared to the row, and if the MAX is less than the row, then the MAX pointer for the particular mask or rule is updated with the row number at S13-8.

For example, during initiation the MAX is set to 0 and the MIN is set to 255. Therefore an insert at row 0 will result in the MIN pointer being set to 0 and the MAX pointer staying at 0. Then, if another row is inserted at row 1, the MIN pointer will stay at 0, but the MAX pointer will be updated to 1.

At step S13-9, the process loops through for every update and steps 13-4–13-9 are reported for each update. The process terminates at step S13-10. It should be noted that in FIG. 13, the processes shown to include a loop. However, the present invention is not so limited, and the updates to the pointers table may occur at any time when a mask or rule is inserted or updated in the table.

FIG. 14 is a flowchart of a method for searching the rules table as part of fast filter-processing in accordance with the present invention. The processing begins at step S14-1 and proceeds to step S14-2, where a packet is received by the switch. As already described above, the switch may receive a packet at a port, and the ingress of that port can transfer the packet to FFP 141. At step S14-3, the first mask is received, such as from the masks table. As already described above with reference to FIG. 12, a next_mask signal or new_mask signal may be used to initiate a mask from the masks table. Then at step S14-4, the mask is multiplied (ANDed) with the data packet in order to filter out the data to be compared against the rules.

Next, at step S14-5, the MAX and MIN pointers for the rules table for the particular mask is received. For example, as already described above with reference to FIG. 10, the next_mask signal may be input to the pointer table to receive the MIN and MAX pointers for the rules table for the particular mask. Next, at step S14-6, a binary search is initiated based on the pointers. As already described above, the boundary for the binary search is defined by the pointers, and the number of steps and delta values are also derived from the pointers. By this method, only corresponding rules are searched for each mask.

Next, at step S14-7, the binary search obtains a rule and compares it to the filtered packet for a match. If there is a match, then the rule is stored at step S14-8 to be processed by internal switch logic, and the processing proceeds directly to step S14-10 from step S14-8. Otherwise, if there is no match, then at step S14-9 it is checked to see if there are any steps left in the binary search. If the binary search is not complete, then processing returns to step S14-7, and the binary search performs the next step and checks for a match with another rule. When the binary search is complete or a rule has been matched, then the search is terminated at step S14-10. At step S14-11, a next mask is obtained, and steps S14-3 through step S14-11 are repeated until no more masks exist for which to search. At step S14-12, the internal switch logic applies the rules stored as appropriate. Processing ends at step S14-13.

Accordingly, systems and methods are provided for performing pointer based binary table searches within a network device, such as a high performance switch. According to the present invention, network device performance is enhanced by through the coordinated use of pointers and keys to limit the scope of searches in order to more quickly perform the searches. One having ordinary skill in the art will readily understand that the preceding systems and methods may be applicable to many on-chip search processes and are not meant to be limited to the embodiments described above or network switches.

Although the invention has been described based upon these preferred embodiments, it would be apparent to those of skilled in the art that certain modifications, variations, and alternative constructions would be apparent, while remaining within the spirit and scope of the invention. For example, any high performance device may benefit from the described method for searching parallel memory banks. Also, other switch configurations could be used to take advantage of the invention. For example, the queue management unit, memory management and search switching unit, may all be separate function blocks or may all be part of the same function block, or some combination thereof. In order to determine the metes and bounds of the invention, therefore, reference should be made to the appended claims.

The invention claimed is:

1. A network device comprising:
   at least one network port;
   a masks table containing filter information and a mask key;
   a rules table having corresponding rules to said filter information and being related to said mask table by said mask key;
   a pointers table containing boundary data related to said rules for corresponding filter information; and
   a fast filter processor coupled to said mask table, said rules table and said pointers table, and configured to perform at least one binary search for at least one rule related to a data packet received by said network device at said at least one network port, said binary search being limited based on said boundary data in said pointers table.

2. The network device of claim 1, wherein said filter information in said rules table is sorted in order, said pointers table contains addresses of maximum and minimum rules in said rules table for each specific mask key value, and wherein said fast filter processor is configured to calculate parameters of said at least one binary search based upon said addresses of maximum and minimum rules in said rules table for each specific mask key value.

3. The network device of claim 2, wherein said fast filter processor is configured to receive said packet and AND said packet with at least one of said filter information related to a single mask key to generate a product, to calculate the parameters of said at least one binary search based upon said addresses of maximum and minimum rules in said rules table for said single mask key value, and to retrieve at least one rule from said rules table based on the results of said at least one binary search based on said product.

4. The network device of claim 1, wherein said fast filter processor comprises semiconductor-based processor components.

5. The network device of claim 3, wherein said fast filter processor is configured to loop through every mask key for said filter information, to AND each of said filter information with said packet, to initiate a binary search for each product, and to store all results of each said binary search.

6. The network device of claim 1, further comprising:
a CPU coupled to said fast filter processor, said rules table, said mask and said pointers table, and configured to store and maintain data in said rules table, said masks table and said pointers table, and to create said minimum and maximum address information in said pointers tables based on inserts and updates to said masks tables or said rules tables.

7. The network device of claim 2, wherein said parameters include number of search steps, search start address and delta per step.

8. A fast filter processing circuit, comprising:
a rules table having an input and output, and configured to store rules related to a network function;
a masks table having an input and output, and configured to store masks related to said rules;
a pointers table having an input and output;
a signal generator coupled to said masks table and said pointers table, and configured to generate a next mask signal;
a multiplier coupled to the output of said masks table and to a data packet input, said multiplier configured to multiply a mask output from said masks table and a data packet input from said data packet input and to output a product of said mask and said data packet;
a comparator coupled to the output of said rules table and the output of said multiplier, and configured to compare said product with a rule output from said rules table and to generate a comparison signal;
a multiplexer having a plurality of data inputs and a control input, said control input coupled to an output of said comparator, said multiplexer configured to output an address signal being one of said plurality of data inputs based on said comparison signal input to said control input;
a feedback loop coupled to the output of said multiplexer and the input of said rules table, to a first input of said comparator, to a subtractor and to an adder;
wherein data in said pointers table defines a number of steps for a search and a starting address for said search, said subtractor subtracts a jump value from an input and outputs an address less than a current address by the jump value to a second input of said multiplexer, said adder adds said jump value to an input and outputs an address greater than a current address by the jump value to a third input of said multiplexer, and said circuit outputs said output of said rules table, such that a rule matching said data packet based on said mask is output of said circuit.

9. The circuit of claim 8, wherein said multiplier comprises an AND gate.

10. The circuit of claim 8, wherein said comparator is configured to output a first comparison signal when said rule and said data packet input to said comparator match, and said multiplexer is configured to output a signal from a first input of said plurality of data inputs, said first input signal being a current address of said search.

11. The circuit of claim 8, wherein said comparator is configured to output a second comparison signal when the value said rule input to said comparator is less than the value of said data packet input to said comparator match, and said multiplexer is configured to output a signal from a second input of said plurality of data inputs, said second input signal being a next address of said search.

12. The circuit of claim 8, wherein said comparator is configured to output a third comparison signal when the value said rule input to said comparator is greater than the value of said data packet input to said comparator match, and said multiplexer is configured to output a signal from a third input of said plurality of data inputs, said third input signal being a next address of said search.

13. The circuit of claim 9, wherein when said rule and said data packet match, said rule output of said circuit is held at a current rule for said current address for a remainder of search steps.

14. A method of filtering a packet in a network device, said network device having a data packet input port and configured to perform at least one network function, said method comprising the steps of:
providing a masks table, a rules table and a pointers table;
relating mask data in said masks table to rules data in said rules table with a key, one of said mask data corresponding to one or more of said rules data;
defining pointer data in said pointers tables defining a maximum and minimum address of corresponding rule data for each of said mask data
receiving a data packet at said data packet input port;
multiplying said data packet with one of said mask data to produce a product;
searching said rules table based on said product and said maximum and minimum address data for said one of said mask data for a match between said product and rules data corresponding to said one of said mask data; and
outputting said match to a function within said network device in order to perform said at least one network function.

15. The method of claim 14, wherein said providing step includes a step of sorting data in said masks table, said rules table and said pointers table numerically, and said searching step includes searching said rules table with a binary search.

16. The method of claim 14, further comprising a step of looping through each of said masks data and performing each step for each of said masks data in order to determine matches between said product for each of said masks data and said data packet with said corresponding rules data.

17. The method of claim 14, wherein said search step includes a step of calculating parameters of said binary search based on said maximum and minimum address data.

18. The method of claim 18, wherein said calculating step includes calculating a number of steps for said binary search, a initial address for said binary search, and a delta for each of said number of steps.

19. A network device comprising:
at least one network port;
a masks table means for containing filter information and a mask key;
a rules table means for corresponding rules to said filter information and being related to said masks table by said mask key;

a pointers table means for containing boundary data related to said rules for corresponding filter information; and a fast filter processor means for coupling to said mask table, to said rules table and to said pointers table, and for performing at least one binary search for at least one rule related to a data packet received by said network device at said at least one network port, said binary search being limited based on said boundary data in said pointers table.

20. The network device of claim 19, wherein said filter information in said rules table means is sorted in order, said pointers table means contains addresses of maximum and minimum rules in said rules table means for each specific mask key value, and wherein said fast filter processor means is for calculating parameters of said at least one binary search based upon said addresses of maximum and minimum rules in said rules table for each specific mask key value.

21. The network device of claim 20, wherein said fast filter processor means is for receiving said packet and AND said packet with at least one of said filter information related to a single mask key to generate a product, calculating the parameters of said at least one binary search based upon said addresses of maximum and minimum rules in said rules table means for said single mask key value, and retrieving at least one rule from said rules table based on the results of said at least one binary search based on said product.

22. The network device of claim 19, wherein said fast filter processor means comprises semiconductor-based processor components.

23. The network device of claim 21, wherein said fast filter processor means is configured to loop through every mask key for said filter information, to AND each of said filter information with said packet, to initiate a binary search for each product, and to store all results of each said binary search.

24. The network device of claim 19, further comprising:
a processor means coupled to said fast filter processor means, said rules table means, said masks table means and said pointers table means, and configured to store and maintain data in said rules table means, said masks table means and said pointers table means, and to create said minimum and maximum address information in said pointers tables means based on inserts and updates to said masks tables means or said rules tables means.

25. The network device of claim 20, wherein said parameters include number of search steps, search start address and delta per step.

26. A fast filter processing circuit, comprising:
a rules table means having an input and output, and for storing rules related to a network function;
a masks table means having an input and output, and for storing masks related to said rules;
a pointers table means having an input and output;
a signal generator means coupled to said masks table means and said pointers table means, and for generating a next mask signal;
a multiplier means coupled to the output of said masks table means and to a data packet input means, said multiplier means for multiplying a mask output from said masks table means and a data packet input from said data packet input means and outputting a product of said mask and said data packet;
a comparator means coupled to the output of said rules table means and the output of said multiplier means, and for comparing said product with a rule output from said rules table means and generating a comparison signal;
a multiplexer means having a plurality of data inputs and a control input, said control input coupled to an output of said comparator means, said multiplexer for outputting an address signal being one of said plurality of data inputs based on said comparison signal input to said control input;
a feedback loop means coupled to the output of said multiplexer means and the input of said rules table means, to a first input of said comparator means, to a subtractor means and to an adder means;
wherein data in said pointers table means defines a number of steps for a search and a starting address for said search, said subtractor means subtracts a jump value from an input and outputs an address less than a current address by the jump value to a second input of plurality of data inputs of said multiplexer means, said adder means adds said jump value to an input and outputs an address greater than a current address by the jump value to a third input of plurality of data inputs of said multiplexer, and said circuit outputs said output of said rules table means, such that a rule matching said data packet based on said mask is output of said circuit.

27. The circuit of claim 26, wherein said multiplier means comprises an AND gate.

28. The circuit of claim 26, wherein said comparator means is configured to output a first comparison signal when said rule and said data packet input to said comparator means match, and said multiplexer means is configured to output a signal from a first input of said plurality of data inputs, said first input signal being a current address of said search.

29. The circuit of claim 26, wherein said comparator means is configured to output a second comparison signal when the value said rule input to said comparator means is less than the value of said data packet input to said comparator means match, and said multiplexer means is configured to output a signal from a second input of said plurality of data inputs, said second input signal being a next address of said search.

30. The circuit of claim 26, wherein said comparator means is configured to output a third comparison signal when the value said rule input to said comparator means is greater than the value of said data packet input to said comparator means match, and said multiplexer means is configured to output a signal from a third input of said plurality of data inputs, said third input signal being a next address of said search.

31. The circuit of claim 27, wherein when said rule and said data packet match, said rule output of said circuit is held at a current rule for said current address for a remainder of search steps.

* * * * *